US012438359B2

(12) United States Patent
Santhanam et al.

(10) Patent No.: US 12,438,359 B2
(45) Date of Patent: Oct. 7, 2025

(54) SYSTEMS AND METHODS FOR UTILITY CONDUCTOR EVENT DETECTION AND RESPONSE

(71) Applicant: Aclara Technologies LLC, St. Louis, MO (US)

(72) Inventors: Balaji Santhanam, Parsippany, NJ (US); Michael Lee Kelley, Birmingham, AL (US); Steven E. Wilder, Solon, OH (US); Douglas J. Batey, Solon, OH (US); Scott G. Leyh, Solon, OH (US); William E. Laudolff, Solon, OH (US)

(73) Assignee: Aclara Technologies LLC, St. Louis, MO (US)

(*) Notice: Subject to any disclaimer, the term of this patent is extended or adjusted under 35 U.S.C. 154(b) by 172 days.

(21) Appl. No.: 17/896,411

(22) Filed: Aug. 26, 2022

(65) Prior Publication Data
US 2023/0064772 A1 Mar. 2, 2023

Related U.S. Application Data

(60) Provisional application No. 63/237,865, filed on Aug. 27, 2021.

(51) Int. Cl.
*H02H 7/22* (2006.01)
*H02H 1/00* (2006.01)

(52) U.S. Cl.
CPC .......... *H02H 7/226* (2013.01); *H02H 1/0007* (2013.01); *H02H 7/22* (2013.01)

(58) Field of Classification Search
CPC ............ H02H 3/02; H02H 7/26; H02H 7/226; H02H 1/0007; H02H 5/10; G01R 31/02; G01R 31/08
(Continued)

(56) References Cited

U.S. PATENT DOCUMENTS 6,459,998 B1 * 10/2002 Hoffman .................. H02H 5/10
361/64
2010/0271743 A1 10/2010 O'Leary et al.
(Continued)

OTHER PUBLICATIONS

PCT/US2022/041655 International Search Report and Written Opinion dated Jan. 25, 2023.
(Continued)

*Primary Examiner* — Danny Nguyen
(74) *Attorney, Agent, or Firm* — Michael Best & Friedrich LLP

(57) ABSTRACT

A system includes a number of sensor units and a local controls station. The sensor units include one or more conductor sensors configured to monitor one or more parameters of a conductor in a power distribution system. The local control station includes a communication interface for communicating with the sensor units and a controller. The controller is configured to receive data from the sensing units, determine whether an event associated with one or more components of a power distribution network occurred based on the received data, and then determine whether the event requires protective action in response to determining that the event occurred. The controller determines whether the event occurred downstream of the local control station, and, in response to determining that the event requires protective action and occurred downstream of the local control station, control the one or more protective devices to perform a protective action.

19 Claims, 7 Drawing Sheets

(58) Field of Classification Search
USPC .................................................... 361/62–69
See application file for complete search history.

(56)         References Cited

U.S. PATENT DOCUMENTS

| | | |
|---|---|---|
| 2014/0028116 A1 | 1/2014 | O'Brien et al. |
| 2014/0077820 A1 | 3/2014 | Al-Ghannam |
| 2015/0075282 A1 | 3/2015 | Chan et al. |
| 2016/0308349 A1* | 10/2016 | Sridharan ............ G01R 31/085 |
| 2017/0302741 A1 | 10/2017 | Conner |
| 2019/0317143 A1 | 10/2019 | Dase et al. |
| 2020/0044435 A1* | 2/2020 | Day ...................... G01R 31/50 |
| 2021/0091559 A1 | 3/2021 | Mobley et al. |

OTHER PUBLICATIONS

International Preliminary Report on Patentability (IPRP) dated Feb. 27, 2024 for corresponding International Application No. PCT/US2022/041655.

European Search Report dated Jul. 1, 2025 for corresponding European Application No. 22862128.0.

* cited by examiner

SYSTEMS AND METHODS FOR UTILITY CONDUCTOR EVENT DETECTION AND RESPONSE

CROSS-REFERENCE TO RELATED APPLICATIONS

This application claims priority to, and the benefit of, Provisional U.S. Patent Application No. 63/237,865, filed Aug. 27, 2021, the contents of which is hereby incorporated by reference in its entirety.

FIELD

Embodiments of the disclosure relate to monitoring power distribution systems and, more particularly, to detecting and mitigating an event associated with a distribution conductor, such as a dropped conductor.

BACKGROUND

Conductors, such as power conductors, are widely used in many settings. Such power conductors form an important part of the power distribution system by carrying electrical power from generation facilities to the locations where it is used by customers, e.g., residential, commercial and industrial. A power distribution system may include many types of conductors, for example, high voltage conductors may be used closer to the power generation facilities or for long distance transmission, and medium and lower voltage conductors may be used closer to the locations where the power is used, such as homes and businesses.

Many power conductors, such as power cables, run overhead, meaning that the conductors are attached to support structures that elevate the conductors above the ground at a safe distance from people on the ground. High voltage power conductors are generally routed through open spaces, but medium and low voltage conductors, which are closer to locations that use the power, are more likely to run over or by roads as well as trees or other objects. In some circumstances various factors can lead to the conductors or their support structures being displaced and possibly falling onto the ground or other objects, which can present significant safety risks to the environment, personnel, or property where the conductors remain energized.

Typically, utility companies may not realize that a conductor has been displaced in this manner until the event is reported by persons who observe the displaced conductor. While in some instances a displaced conductor may result in a ground fault or other overcurrent situation addressed by various protective devices in the system, the location and type of displaced conductor may not be readily recognized by the utility for some time, thereby increasing the time required to restore service. Further, intelligent utility grid systems may not receive notification that an event, such as a fallen conductor event, has occurred for several minutes, or longer. Once receiving the information, a maintenance team may be required to be dispatched to address any potential issues such as displaced live conductors, requiring additional time to address the displaced conductors.

SUMMARY

Conductor monitoring is facilitated through various sensor units that collect data associated with a position or movement of one or more conductors. The data may be transmitted to a local control station which may be configured to quickly analyze an event detected by the sensor units and perform protective action, such as de-energizing the conductors.

In one embodiment, a power distribution panel includes one or more power protection devices, a controller configured to control the operation of the one or more power protection devices, and an electronic processor coupled to the controller. The electronic processor is configured to receive data from one or more power distribution devices and based on the data determine whether an event associated with one or more components of a power distribution network has occurred and whether the event requires protective actions. The electronic processor is further configured to determine whether the event occurred at a portion of the power distribution network on the load side of the one or more power protection devices, and in response to determining that the event occurred at the portion of the power distribution network on the load side of the one or more power protection devices, instructing the controller to control the power protection devices to perform a protective operation.

In another embodiment, a system includes several sensor units and a local controls station. The sensor units include one or more conductor sensors configured to monitor one or more parameters of a conductor in a power distribution system, and a conductor support sensing unit in communication with the one or more conductor sensors via a first communication protocol. The conductor support sensing unit includes a communication interface configured to transmit data sensed by the one or more conductor sensors and one or more sensors within the conductor support sensing unit using a second communication protocol. The local control station includes a communication interface configured to communicate with the conductor support sensing unit via the second communication protocol. The local control station also includes one or more protective devices and a controller. The controller is configured to receive data from one or more of the sensing units, determine whether an event associated with one or more components of a power distribution network occurred based on the received data, and determine whether the event requires protective action in response to determining that the event occurred. The controller is further configured to determine whether the event occurred downstream of the local control station, and, in response to determining that the event requires protective action and occurred downstream of the local control station, control the one or more protective devices to perform a protective action.

In another embodiment, a method includes receiving data indicating an event associated with a power distribution system has occurred at a local control station and determining whether the event requires protective action. The method also includes determining whether the local control station receiving the data can perform the protective action in response to determining that the event requires protective action. The method further includes performing the protective action in response to determining that the local control station receiving the data can perform the protective action.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claims and explain various principles and advantages of those embodiments.

Figure 1:
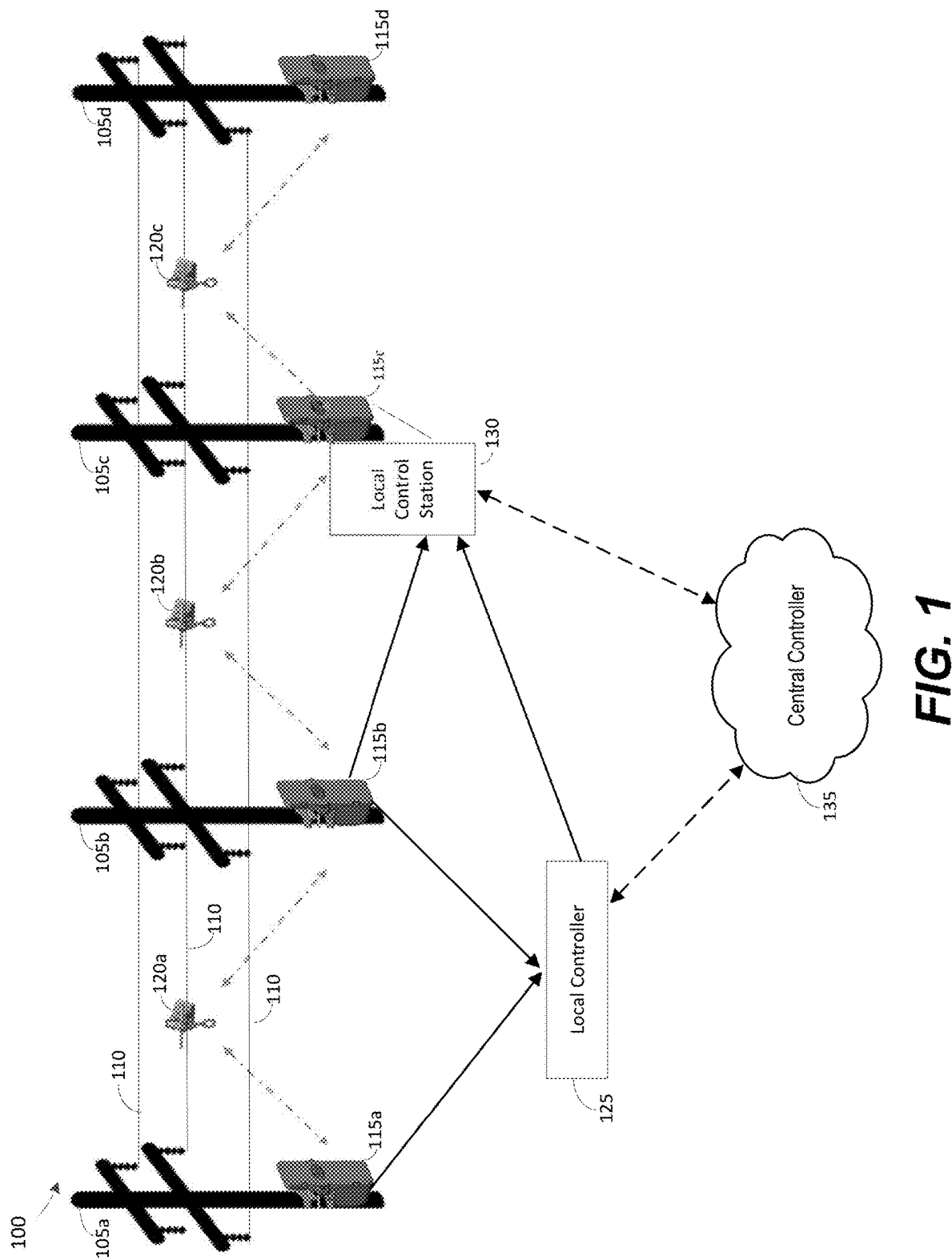
FIG. 1 is a diagram of a conductor monitoring system, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of other embodiments and of being practiced or of being carried out in various ways.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing specific functionality may also perform additional functionality not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" includes all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Also, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

FIG. 1 illustrates a local power distribution monitoring system 100 according to some embodiments. In one exemplary embodiment the monitoring system 100 is configured to monitor multiple support structures 105a-d (e.g., "poles") supporting overhead conductors 110 within a power distribution system. In some examples, the power distribution system is a low-voltage power distribution system. However, implementation of the below systems and methods is also contemplated for both medium voltage and high voltage system. Further, the distribution system may be a three-phase alternating current ("AC") distribution system. However, single phase AC distribution systems as well as other polyphase AC distribution systems (e.g., 6-phase, 12-phase, etc.), DC distribution systems, or other distribution systems are also contemplated.

In some embodiments, the conductors 110 are power lines, but other types of conductors, such as communication lines may be supported by the conductor support structures 105a-d. In some embodiments, the monitoring system 100 monitors positions of the conductor support structures 105a-d to identify a need for maintenance or repair of selected conductor support structures 105a-d. For example, an affected conductor support structure 105a-d may be moved or damaged due to a vehicular accident, a weather event, a fallen tree, or the like, such that its orientation is altered. Such an orientation change may affect the physical and/or functional integrity of the conductors 110, may compromise neighboring conductor support structures 105a-d, or may endanger individuals near the affected conductor or conductor support structure 105a-d, for example, danger from fallen conductors 110 or a fallen conductor support structure 105. Similarly, the monitoring system 100 monitors position (as well as other parameters) of the conductors 110. For example, various factors such as environmental (wind, ice, fire, falling trees, etc.), human (collisions with conductor support structures 105a-d), and other factors may result in a conductor 110 breaking free of the conductor support structures 105a-d and falling to the ground which can result in loss of power to customers, as well as potential risks resulting from an energized conductor. Accordingly, monitoring position (or other parameters) of a conductor 110 are important for effective management and operation of a power distribution system.

The monitoring system 100 is further configured to monitor multiple overhead conductors 110. The monitoring system 100 may include one or more pole sensor devices 115a-d. The pole sensor devices 115a-d are described in more detail below. In some examples, the pole sensor devices 115a-d may include one or more line sensors 120a-c, which are attached to the overhead conductors 110 and communicate with the pole sensor devices 115a-d to provide additional information regarding the overhead conductors 110, as described in more detail below. While FIG. 1 shows only a single phase or conductor in a multiphase system having a line sensor, it is contemplated that each conductor coupled to the conductor support structures 105a-d may have a line sensor 120a-c associated therewith for monitoring one or more parameters of the associated conductor 110.

The monitoring system 100 may further include a local controller 125. The local controller may be used as an intermediate device to provide communication between the pole sensor devices 115a-d and one or more other devices, such as a local control station 130 and/or a central controller 135. In one embodiment, the local controller 125 may be a data collection unit ("DCU") such as a DCU2+ device from Aclara Technologies, LLC. However, other local control devices are also contemplated. In one embodiment, the local controller 125 may be configured to support Advanced Metering Infrastructure ("AMI") applications for electric, water, gas, load control, distribution automation, Smart Infrastructure Solutions, and/or other advanced applications. The local controller 125 may be in communication with one or more pole sensor devices 115a-d, as shown in FIG. 1. The local controller 125 may further be in communication with a local control station 130.

Furthermore, as shown in FIG. 1, one or more of the pole sensor devices 115a-d may communicate directly with the local control station 130. For example, where a pole sensor device 115a-d is in communication range of the local control station 130, the pole sensor devices 115a-d communicate directly with the local control station 130 instead of through one or more local controllers. In some examples, one or more pole sensors devices 115a-d may communicate with both the local distribution control station 130 and the local controller 125. In one embodiment, the ability of the one or more pole sensor devices to communicate with either the local controller 125 and/or the local control station 130 is based on a communication range for a given pole sensor device 115a-d. As described in more detail below, the pole sensor devices 115a-d communicate with other devices, such as the local controller 125 and/or the local control station 130 using one or more wireless communication protocols. Thus, the communication range of a given pole sensor device 115a-d is based on various factors, such as topography, weather conditions, communication protocol types, etc. Accordingly, the local controllers 125 may be located to allow for pole sensor devices 115a-d out of communication range of the local control station to relay communications from the applicable pole sensor devices 115a-d to one or more local controls stations via the local controller 125.

For example, as shown in FIG. 1, the pole sensor device 115a may only be able to communicate with local controller 125 based on a communication range of the pole sensor device 115a. The local controller 125 may then communicate the data provided by the pole sensor device 115a to the local control station 130, as the local controller 125 may have an increased communication range over the pole sensor device 115a (e.g., due to high power transmitter, increased elevation, etc.). In contrast, the pole sensor device 115b may be able to communicate with both the local controller 125 and the local control station 130. Additionally, as shown in FIG. 1, the pole sensor device 115c may only be able to communicate with the local control station 130 based on a communication range of the pole sensor device 115c (e.g., the pole sensor device 115c is not within communication range of the local controller 125. It is understood that the examples provided above are for illustrative purposes only, and then in a normal power distribution system there may be multiple conductor support structures 105a-d, multiple pole sensor devices 115a-d, multiple local controllers 125, and multiple local control stations 130.

The local control station 130 may be configured to control one or more aspect of a power distribution system associated with the monitoring system 100, as described in more detail below. The local control station 130 and/or local controller 125 may further be configured to be in communication with the central controller 135. In some embodiments, the central controller 135 is a cloud-based and/or on-premises control system configured to monitor various aspects of a utility distribution system. In some embodiments, the central controller 135 is configured to display information to one or more users based on data received from devices such as the local controller 125 and/or the local control station 130. The central controller 135 may further be configured to generate outputs, such as maintenance requests, based on data received from the local controller 125 and/or the local distribution control station. In some embodiments, the central controller 135 may execute one or more software packages related to management and oversight of a utility distribution system, such as a power distribution system. For example, the software package may be AclaraONE® software from Aclara Technologies, LLC.

Each pole sensor device 115a-d and/or line sensor 120a-c may contain one or more types of sensors and circuitry for controlling the collection of data and transmission of that data for analysis. In some embodiments, each sensor unit may contain circuitry, such as an electronic processor, for processing the data prior to transmission. The times at which the sensor data is transmitted may be periodic, randomized, and/or may be dynamically determined based on detection of changing conditions. For example, sensor data may be transmitted when a monitoring threshold configured for the pole sensor devices 115a-d is violated. In some embodiments, a reporting frequency for the pole sensor devices 115a-d is increased responsive to a change in the environmental conditions (e.g., a snowstorm arrives, a tree falls, it becomes windy, or the like).

Figure 2:
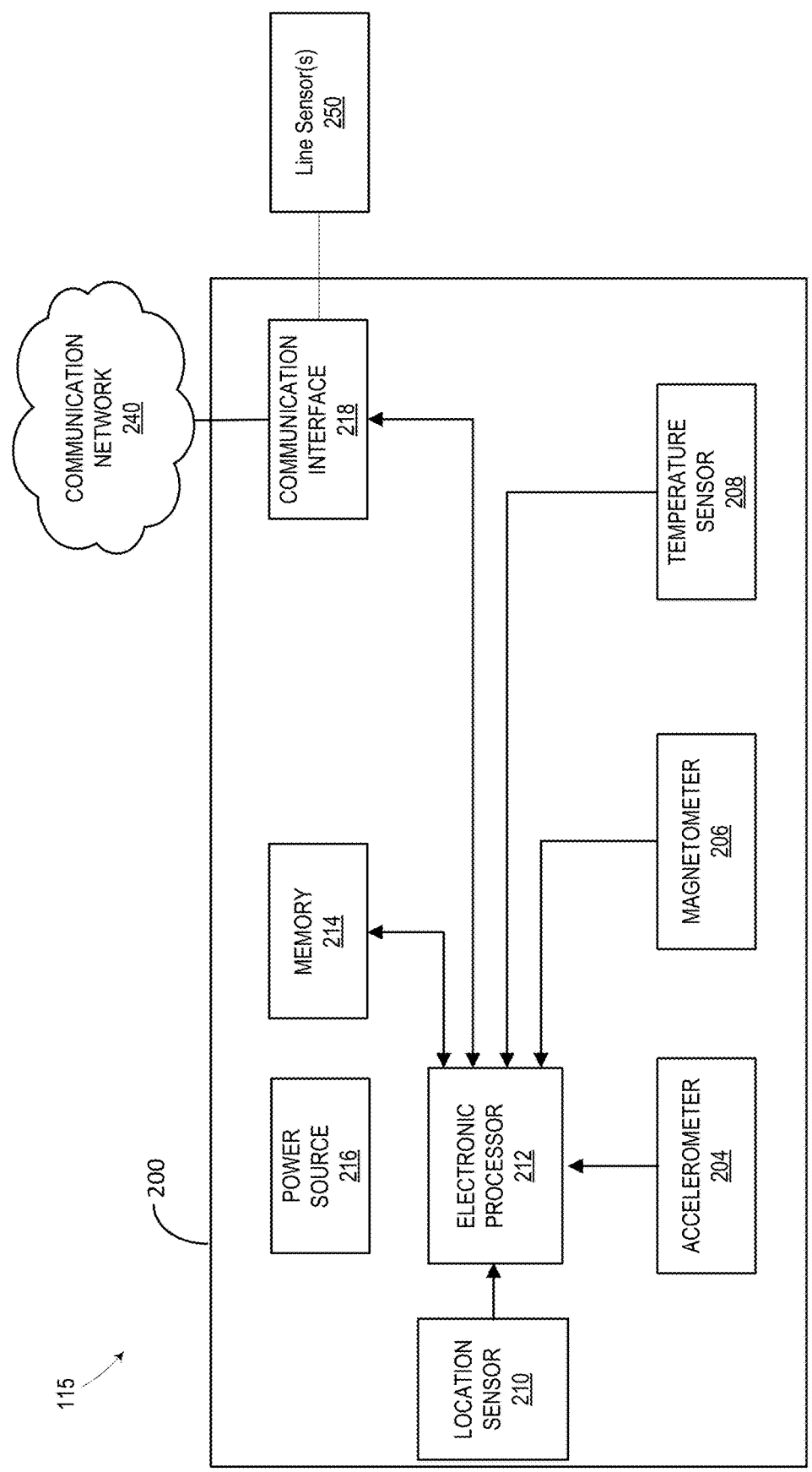
FIG. 2 is a block diagram of a conductor support sensing device, according to some embodiments.

FIG. 2 is a block diagram of a pole sensing device 200, according to some embodiments. The pole sensing device 200 may be similar to the pole sensor devices 115a-d described above in regard to FIG. 1 and should be understood to be able to be used interchangeably herein. In some examples, the pole sensing device 200 may be referred to as a conductor support sensing device. Each pole sensing device 200 may contain a housing 202 (not shown) that is environmentally sealed. Such a housing 202 may be manufactured with any suitable materials, including materials used for components used in exterior locations, such as power distribution systems and/or telephone systems. Sensors and control circuitry may be enclosed within the housing 202. One or more types of sensors may be included in the pole sensing device 200, such as an accelerometer 204 (e.g. 2-axis, 3-axis, 4-axis, etc.), a magnetometer 206 (e.g. 2-axis, 3-axis, 4-axis, etc.), a temperature sensor 208 (e.g. thermistor), and/or a location sensor 210 (e.g. GPS, Glonass).

As illustrated in FIG. 2, exemplary pole sensing device 200 further includes an electronic processor 212, a memory 214, a power source 216, and a communication interface 218. The accelerometer 204 and magnetometer 206 may be referred to as orientation sensors. In some embodiments, the accelerometer 204 and the magnetometer 206 are three-axis devices. In some embodiments, data from the temperature sensor 208 is employed to provide temperature compensation for the accelerometer 204 and the magnetometer 206. However, in other embodiments, the temperature sensor 208 may also provide temperature information to the electronic processor 212 for determining a temperature around the pole sensing device 200, e.g., sensing freezing conditions or fire. It should be appreciated that pole sensing device 200 may include any of numerous other types of sensors in addition to or instead of the above-described sensors.

The memory 214 may include read only memory (ROM), random access memory (RAM), other non-transitory computer-readable media, or combinations thereof. The electronic processor 212 is configured to communicate with the memory 214 to store data and retrieve stored data. The electronic processor 212 is configured to receive instructions and data from the memory 214 and execute, among other things, the instructions. In particular, the electronic processor 212 executes instructions stored in the memory 214 to perform one or more of the processes described herein.

In one embodiment, the power source 216 is configured to provide power to the various components of the pole sensing device 200. In some embodiments, the pole sensing device 200 receives external power and the power source 216 converts and distributes the external power to the various components of the pole sensing device 200. In some examples, the power source 216 includes a battery. In some instances, the battery may be the sole power source, or may be configured to provide backup power when external power is not available.

The communication interface 218 (e.g., a transceiver) allows for communication between the electronic processor 212 and one or more external devices, such as one or more external line sensors 220, local controllers 125 (FIG. 1), and/or local control stations 130 (FIG. 1), as described herein. The communication interface 218 may further provide communication with other external devices, such as the central controller 135 (FIG. 1) via the communication network 240. In some embodiments, the communication interface 218 may include separate transmitting and receiving components. In some embodiments, the communication interface 218 is a wireless transceiver that encodes information received from the electronic processor 212 into a carrier wireless signal and transmits the encoded wireless signal to one or more external devices, as described above. The communication interface 218 also decodes information received from one or more external devices and provides the decoded information to the electronic processor 212. The communication network 240 may include a power line network or a wireless network (e.g., BLUETOOTH®, Wi-Fi, Wi-Max, cellular (3G, 4G, 5G, LTE), RF, LoRa, Zigbee, and/or other wireless communication protocols applicable to a given system or installation). In one embodiment, the communication interface 218 may use a proprietary wireless communication protocol, such as Synergize RF from Aclara Technologies, LLC. The communication interface 218 may be configured to use a communication protocol operating at various frequencies, such as 450-470 MHz, 900 MHz, and/or other frequencies as required for a given application.

As shown in FIG. 2, the pole sensing device 200 may further communicate with one or more line sensors 250. The line sensors 250 may be configured to be coupled to one or more conductors 110 (FIG. 1) associated with a conductor support structure 105 (FIG. 1) coupled to the pole sensing device 200. In some embodiments, multiple line sensors 250 may be in communication with the pole sensing device 200.

Figure 3:
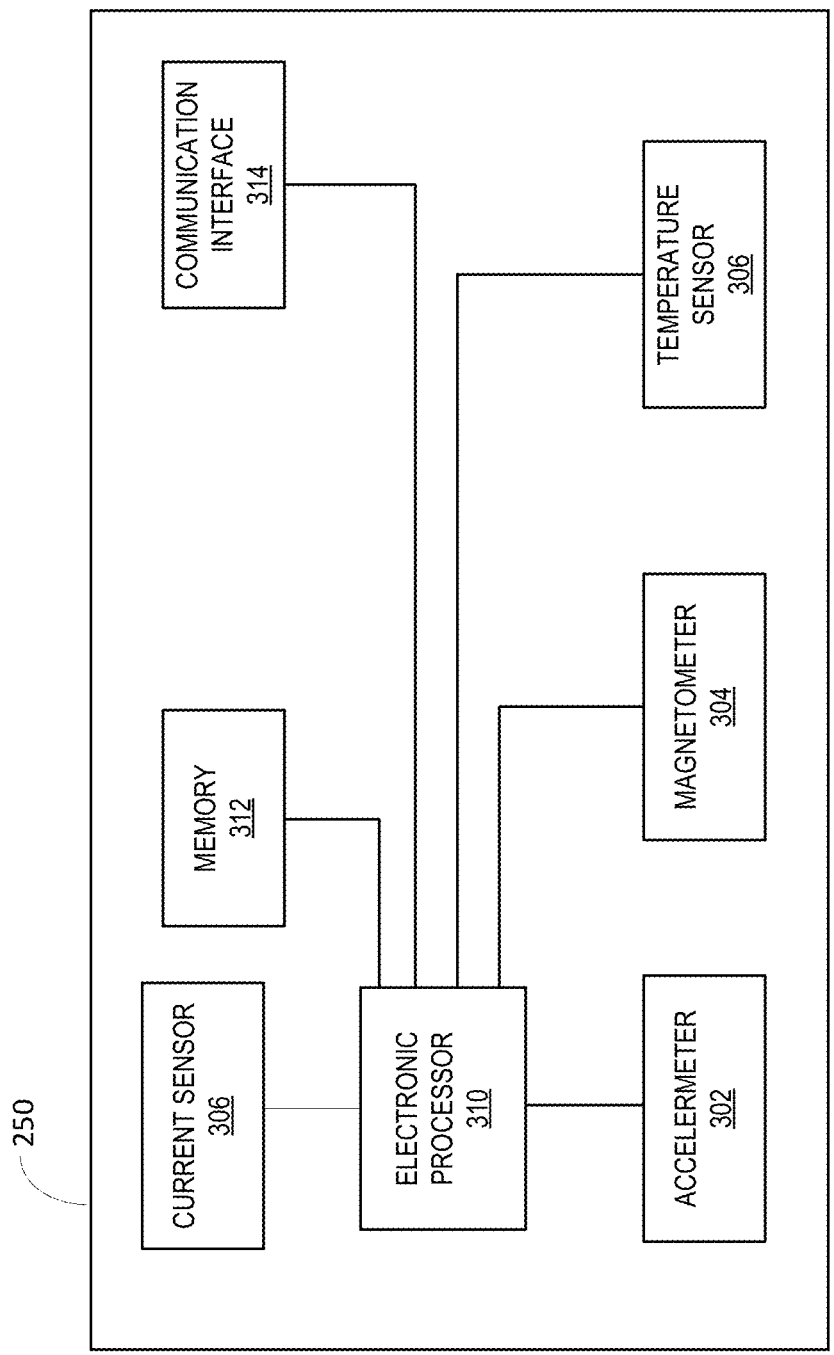
FIG. 3 is a block diagram of a line sensor device, according to some embodiments.

Turning now to FIG. 3, a block diagram illustrating an example line sensor 250 is shown, according to some embodiments. Similar to the pole sensing device 200 (FIG. 2), the line sensor 250 may include one or more sensors, such as one or more accelerometers 302 (e.g., 2-axis, 3-axis, 4-axis, etc.), a magnetometer 304 (e.g. 2-axis, 3-axis, 4-axis, etc.), a temperature sensor 306 (e.g. thermistor), a current sensor 308 (e.g., current transformer), etc. The sensors within the line sensor 250 may be configured to detect various parameters associated with an associated conductor. For example, the one or more accelerometers 302 may be used to detect conductor conditions, such as a falling line, a line sag, galloping, etc. Other sensors, such as the temperature sensor 306, may detect an increase in temperature, indicating a possible overload or high-resistance condition. Additionally, the temperature sensors 306 may detect a potential icing condition for the associated conductor 110 (FIG. 1). The current sensors 308 may be configured to detect an electrical current within a given conductor 110 and determine whether one or more current-based faults (e.g., overcurrent, ground fault, etc.) are present on a given conductor.

The line sensor 250 may further include an electronic processor 310, a memory 312, and a communication interface 314. The memory 312 may include read only memory (ROM), random access memory (RAM), other non-transitory computer-readable media, or combinations thereof. The electronic processor 310 is configured to communicate with the memory 312 to store data and retrieve stored data. The electronic processor 310 is configured to receive instructions and data from the memory 312 and execute, among other things, the instructions. In particular, the electronic processor 310 executes instructions stored in the memory 312 to perform one or more of the processes described herein.

The line sensor 250 may communicate with the pole sensing device 200 via the communication interface 314. For example, the communication interface 314 may communicate with the pole sensing device 200 using Bluetooth®. However, the communication interface 314 may communicate with the pole sensing device 200 using any of the communication protocols described above with respect to the communication interface 314.

Figure 4:
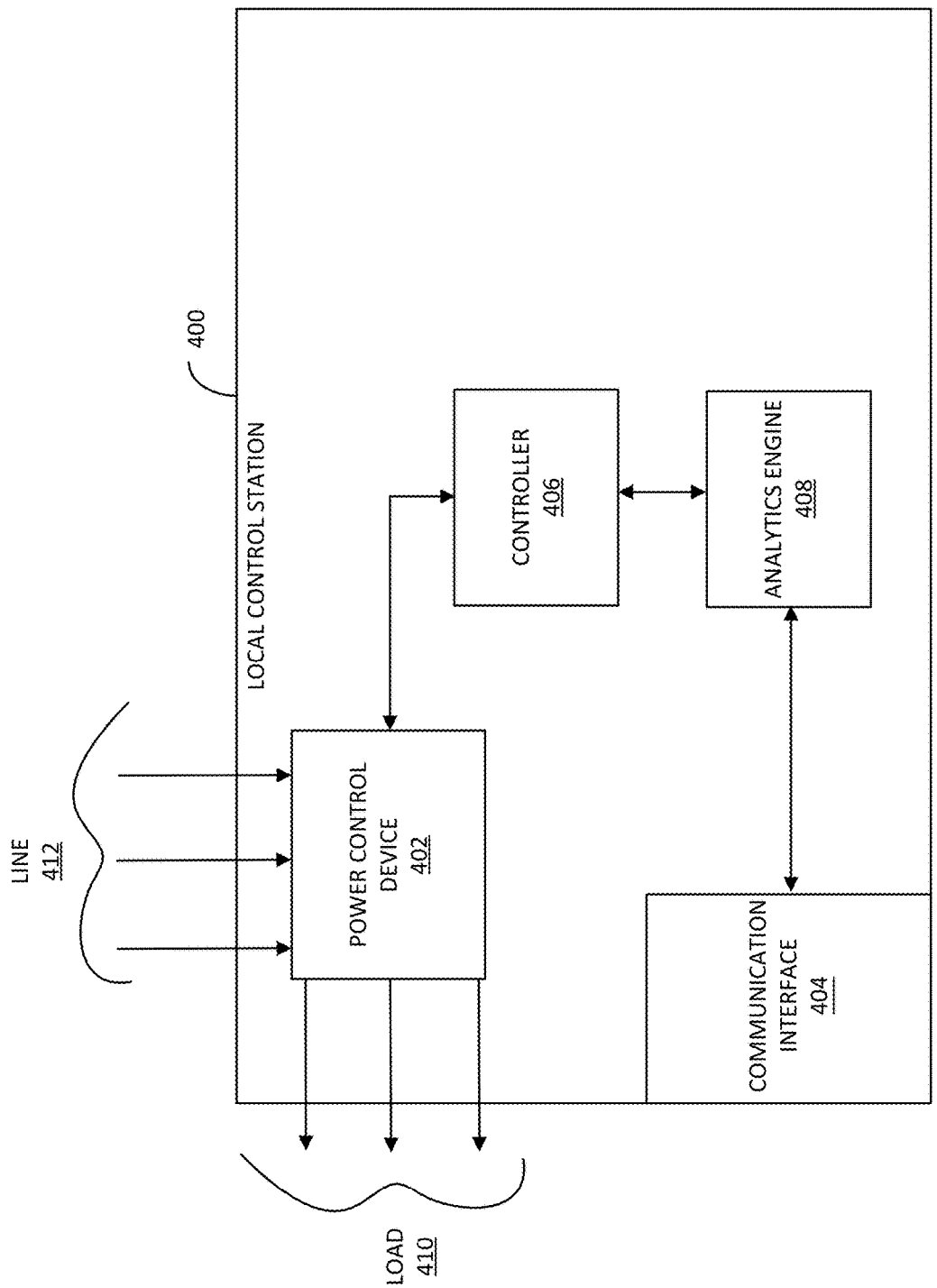
FIG. 4 is a block diagram of a local control station, according to some embodiments.

Turning now to FIG. 4, a block diagram of an exemplary local control station 400 is shown, according to some embodiments. In one embodiment, the local control station 400 may be identical, and used interchangeably with, the local control station 130 described above. The local control cabinet may be located near one or more conductor supports within a power distribution system As shown in FIG. 4, a local control station 400 in accordance with one or more exemplary embodiments may include one or more power control devices 402, a communication interface 404, a controller 406 and an analytics engine 408. The power control devices 402 may include various devices to control the power provided to the conductors 110 on a load side 410 of the power control devices 402. For example, power control devices 402 may include devices such as reclosers, tap switches, capacitor banks, etc. In one example, wherein the power control devices 402 include a recloser, the power control device 402 may open such that the line side power 412 is separated from the load side 410, thereby de-energizing conductors 110 (FIG. 1) coupled to the load side 410 of the power control devices 402. Other power control devices 402, such as tap switches, may be configured to vary a voltage provided to the conductors 110 via the load side 410 of the power control device 402.

The controller 406 may be configured to control one or more of the power control devices 402 described above. In one embodiment, the controller 406 may be an M-7679 R-Pac controller from Beckwith Electric Co., Inc. However, other controllers 406 may also be used as required for a given application. The analytics engine 408 may be configured to analyze data received from the one or more pole sensing devices, such as pole sensing device 200, and/or local controllers 125 via the communication interface 404. In one example, the analytics engine 715 may be configured to determine one or more events to have occurred based on the received data, such as a line falling event. A line falling event may occur when one or more conductors, such as conductors 110 described above, fall or otherwise become disconnected from the conductor support structure 105. Data from a sensor, such as an accelerometer 302 associated with a line sensor 250 may provide data to the power control device 402 indicating a falling line event, as will be described in more detail below. Other events may include various conductor support events, such as those described above (e.g., galloping, fire, sag, falling, etc.).

In some embodiments, the analytics engine 408 may be configured to control the one or more power control devices 402 to shut down, disconnect, or modify power provided to a portion of a power distribution system. In one embodiment, the analytics engine 408 may be an Edge Gateway Device from Aclara Technologies, LLC. However, in other embodiments, various controllers and/or electronic processors may operate as the analytics engine 408. In some examples, the analytics engine 408 may be configured to provide an interface to the controller 406, thereby allowing other devices (e.g., pole sensing devices 200, local controllers 125, etc., using various communication protocols, as described herein, to communicate with the controller 406. In other embodiments, the analytics engine 408 may be integral to the controller 406.

As the local control station 400 receives data directly from the local controllers 125 and/or pole sensing devices 200, actions to address a detected event can be performed in less time than where a central controller, such as central controller 135 is required to analyze the data and instruct one or more local control stations 400 to perform actions required to address the event. For example, by utilizing local control stations 400, various operations, such as detecting and an event and controlling the power control devices 402 to perform one or more actions in response to the event may occur on the order of milliseconds ("ms"). For example, in some embodiments, an event may be detected, and the power control devices 402 operated in response to the event in less than 1 second. However, values of more than 1 second or less than 1 second are also contemplated. In contrast, existing systems, such as those relying on communication with a centralized controller, such as central controller 135, may take minutes to even receive a notification that an event has occurred, and additional time to take correction actions.

The communication interface 404 may be configured to wirelessly communication with devices such as the local controller 125 and/or the pole sensing devices 200 using one or more wireless communication protocols. In one embodiment, the wireless communication protocol may be a proprietary RF communication protocol, such as Synergize RF from Aclara Technologies, LLC. Other wireless communication protocols may include cellular (e.g., 3G, 4G, 5G, LTE, etc.), Bluetooth, LoRa, Zigbee, RF, Wi-Fi, Wi-Max, and/or other wireless communication protocols applicable to a given system or installation. The communication interface 404 may further be configured to communicate with other devices, such as the central controller 135. In some embodiments, the communication interface 404 may communicate with the central controller 135 using wireless communication protocols, such as those described above. In other examples, wired communication protocols, such as PLC, serial, Ethernet, etc., may be used by the communication interface 404 to communicate with the central controller 135. For example, the local control station 400 may transmit data indicating event detection and subsequent actions taken to the central controller 135.

Figure 5:
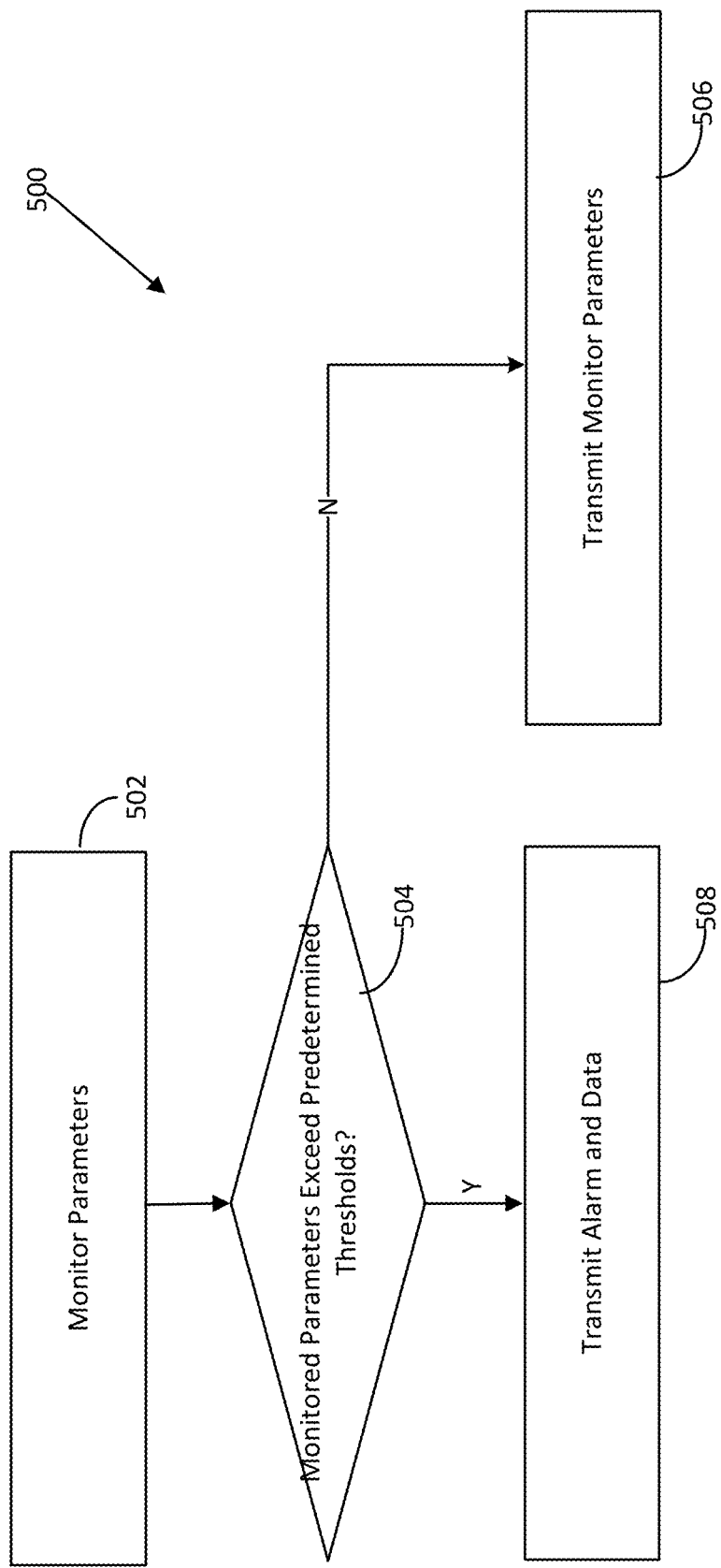
FIG. 5 is a flow chart illustrating a process for monitoring a conductor with a line sensor, according to some embodiments.

Turning now to FIG. 5, a process 500 for detecting a line fall event of a conductor 110 at a line sensor, such as line sensors 250 described above, is shown, according to some embodiments. While the process 500 is described as being performed by the line sensors 250 described above, it is contemplated that other line sensors or devices may perform the various steps of process 500. At process block 502, the line sensor 250 monitors various parameters associated with a conductor 110 to which the line sensor 250 is coupled. For example, as described above, various parameters may be monitored by the line sensor 250, such as motion via the accelerometer 302, current via the current sensors 308, temperature via the temperature sensors 306, etc.

At process block 504, the processor 310 determines whether one or more of the monitored parameters indicate a falling line condition. For example, where the accelerometer detects that the line is falling at a rate that exceeds a predetermined value, such as 10 ft/s, the data from the accelerometer 302 may be determined to exceed a predetermined threshold associated with a falling conductor 110. However, values of more than 10 ft/s or less than 10 ft/s may also be used as a predetermined threshold. In response to determining that the monitored parameters do not exceed a predetermined threshold indicating a falling line, the monitored parameters are transmitted to one or more pole sensing devices 200 via the communication interface 314 at process block 506. In one embodiment, the monitored parameters are transmitted via the communication interface 314 at predetermined intervals. For example, a predetermined interval may be 1 second. However, predetermined intervals or more than 1 second or less than 1 second are also contemplated. In one embodiment, the monitored parameters are transmitted to one or more pole sensing devices, such as pole sensing devices 200 described above.

In response to determining that the monitored parameters do exceed a predetermined threshold indicating a falling conductor, an event message is transmitted along with the monitored parameters to one or more pole sensing devices 200 via the communication interface 314 at process block 508. In one embodiment, the event message includes an indication that a falling conductor condition was determined based on the monitored parameters. While the process 500 describes only transmitting an event message based on a falling conductor condition, it is contemplated that other conditions determined based on the monitored parameters may also generate an event message, such as galloping lines, line sag, etc.

Figure 6:
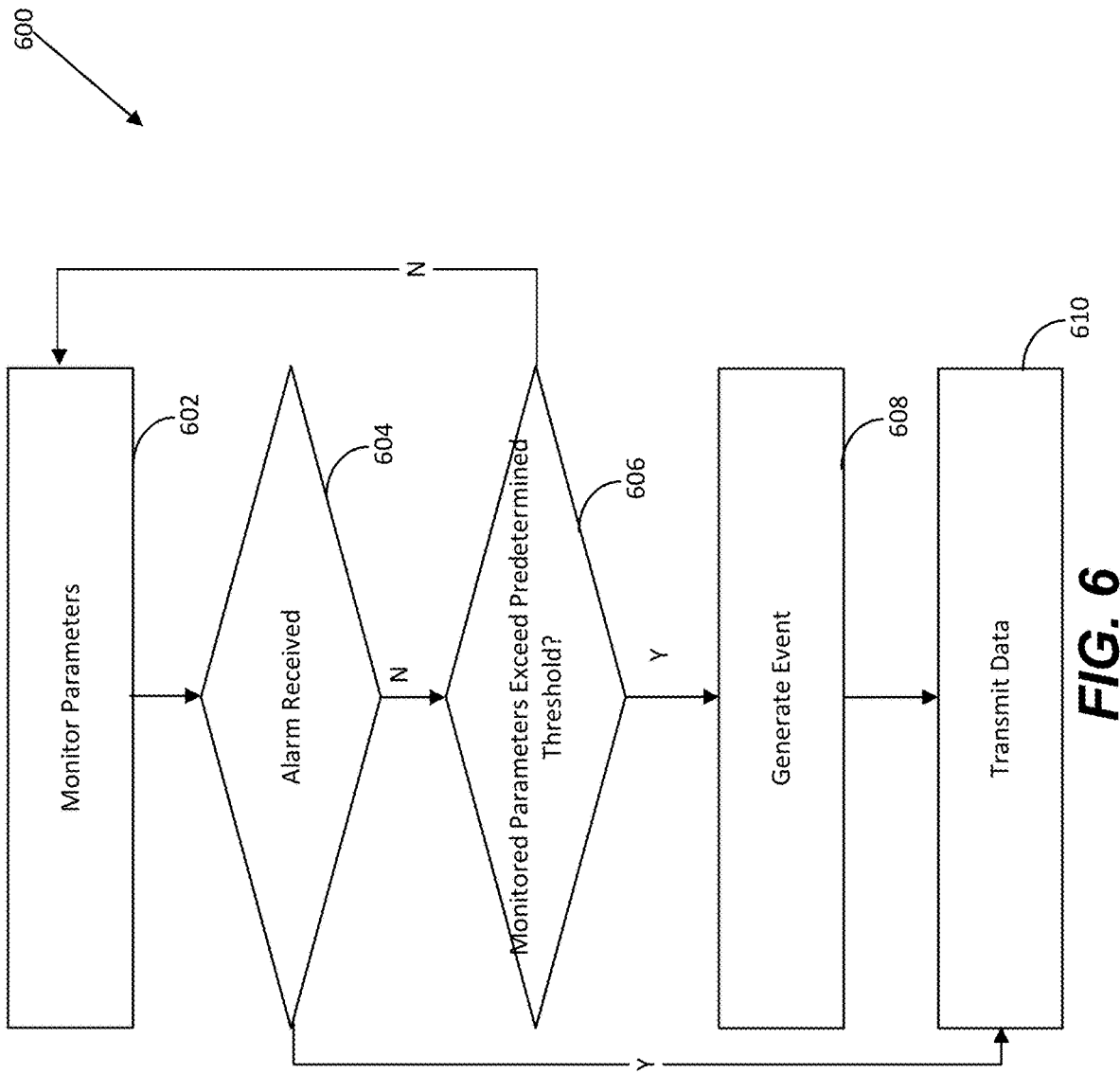
FIG. 6 is a flow chart illustrating a process for determining the occurrence of an event associated with a component of a power distribution system, according to some embodiments.

Turning now to FIG. 6, a process 600 for determining events at a pole sensing device, such as pole sensing device 200 described above, is shown according to some embodiments. At process block 602, the pole sensing device 200 monitors various parameters via the one or more sensors associated with the pole sensing device 200. As described above, the pole sensing device 200 may include an accelerometer 204, magnetometer 206, temperature sensors 208, etc. for monitored various parameters associated with a conductor support structure 105. The pole sensing device 200 may further monitor data associated with conductors 110 that are received from the line sensors 250, such as described above.

At process block 604, the electronic processor 212 determines whether an event message has been received from a line sensor 250. As described above, a line sensor 250 may transmit an event message to the pole sensing device 200 in response to an event, such as a falling conductor event, being determined. In response to determine that an event message has been received from one or more line sensors 250, the event message and the associated monitored parameters are transmitted via the communication interface 218 at process block 606. In some embodiments, the event message and the associated monitored parameters are transmitted to one or more local control stations, such as local control station 400, described above. The event message and associated monitored parameters may also be transmitted to one or more local controllers 125, for further transmission to other devices such as local control station 400 and/or central controller 135. The event message and associated monitored parameters may also be transmitted to a central device, such as central controller 135 described above. In addition to transmitting the event message and associated monitored parameters, additional data such as an identifier of the line sensor 250 transmitting the event message, an identifier of the pole sensing device 200 receiving the event message, a position of the pole sensor device 115a (e.g. via the location sensor 210), and/or other pertinent data may further be transmitted at process block 606.

In response to determining that no event message was received at process block 604, the electronic processor 212 determines whether the monitored parameters exceed one or more predetermined thresholds indicating an event occurrence at process block 608. For example, events may include falling conductor support structures 105, out of position conductor support structures 105, galloping conductors 110, over current events, overtemperatures, detected collisions with a conductor support structure 105 and/or other events as described herein.

In response to determining that the monitored parameters do not exceed any predetermined thresholds, the pole sensing device 200 continues to monitor multiple parameters at process block 602. In response to determining that the monitored parameters do exceed one or more predetermined thresholds, an event is generated at process block 610 based on the monitored parameters. In some events, the events may include an event type, as well as identifying information of the pole sensing device 200 and/or line sensors 250 that detected the event. The one or more determined events are then transmitted at process block 606, as described above.

Figure 7:
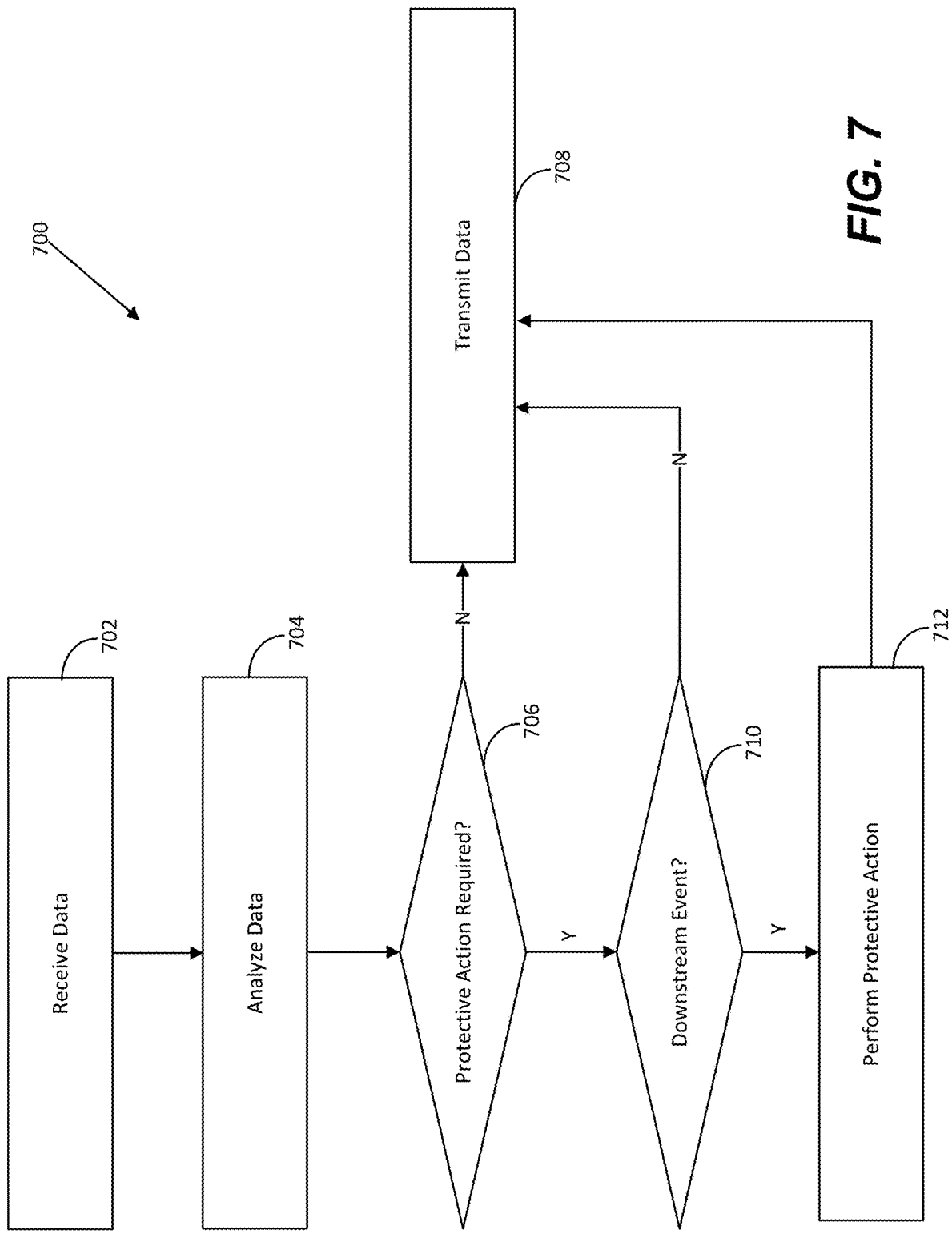
FIG. 7 is a flow chart illustrating a process for performing a protective action in response to an event occurring within a power distribution system, according to some embodiment.

Turning now to FIG. 7, a process 700 for performing one or more protective actions for a portion of a power distribution system is shown, according to some embodiments. In one embodiment, the process 700 is executed by a local control station, such as local control station 400 described above. At process block 702, the local control station 400 receives data from one or more sensing devices, such as pole sensing devices 200, described above. In other embodiments, the data may be received via one or more local controllers 125, as described above.

At process block 704, the local control station 400 analyzes the data. For example, the received data may be analyzed via the analytics engine 408 described above. In other examples, the one or more controllers 406 and/or the analytics engine 408 may analyze the data. In one embodiment, the local control station 400 analyzes the data to determine whether an event has been detected, and/or whether the data indicates whether one or more protective actions may be required. At process block 706, the local control station 400 determines whether a protective action is required based on the analyzed data. For example, where the analyzed data indicates that a falling conductor event is detected, a protective action may be required to prevent the conductor from being in an energized state before coming into contact with, or shortly after contact with, the ground or other objects.

Other events, such as galloping lines, falling conductor supports, etc., may require protective actions as well. In response to determining that no protective action is required based on the analyzed data and/or received events, the analyzed data is transmitted to a central controller, such as central controller 135, at process block 708. The analyzed data transmitted to the central controller 135 may include the type of determined event, identities of the sensors, sensing devices, or local controllers that sensed and/or transmitted the event data, and any protective action taken. Examples of events that may do not require immediate protective actions may include out of position conductor supports, conductor sag, iced conductors, etc. By transmitting the data to the central controller 135, various maintenance operations may be scheduled or initiated to address the events and/or analyzed data.

In response to determining that protective action is required, the local control station 400 determines whether the event occurs downstream (e.g., on the load side 410) of the local control station 400. Events occurring upstream (e.g., on the line side 412) of the local control station cannot be addressed by the downstream local control station 400. In response to determining that the event does not occur downstream, the analyzed data is transmitted at process block 708. In one embodiment, the analyzed data is transmitted to the central controller 135 at process block 708. It is understood that while one local control station 400 may be downstream of a detected event, one or more other local control stations 400 may be positioned upstream of a detected event and will have received the data from the one or more pole sensing devices 200 such that they can perform appropriate protective actions. For example, as shown in FIG. 1, the conductors 110 from conductor support structure 105a to conductor support structure 105c may be downstream of the local control station 130, thereby allowing the local control station 130 to disconnect power at conductor support structure 105c, which carries through to at least conductor support structures 105a-b, via their associated conductors 110. In contrast, conductors 110 between conductor support structures 105c and 105d will remain energized in the example shown in FIG. 1.

In some embodiments, the local control station 400 may include information relating to all the pole sensing devices 200 within a network, or within a given area. Accordingly, based on the pole sensing device identification information transmitted by a pole sensing device 200, as described above, the local control station 400, such as via the analytics engine 408, may be able to determine the location of the detected event, and therefore determine whether the event occurred downstream of the local control station 400. In other examples, the local control station 400 may utilize other data, such as positional data proved by the location sensor 210 of the pole sensing device 200 to determine whether the event occurred downstream of the local control station 400.

In response to determining that the event occurred downstream of the local control station 400, the local control station executes one or more protective actions at process block 712. As described above, protective actions may include de-energizing conductors downstream of the local control station 400 using power control devices 402, such as reclosers or switches. In some embodiments, the protective action may be based on the type of event, such as permanent or transient event. An example permanent event may be a falling conductor event, or any other event which requires maintenance to be corrected. For a permanent event, the protective action may include de-energizing the conductors downstream of the local control station and locking out the power control device 402, such that the downstream conductors may only be re-energized by an affirmative action my maintenance personnel once the event has been resolved. For examples, where the power control device 402 is a recloser device, the recloser is locked out by the controller 406 to prevent subsequent reclosing operations allowing for the downstream conductors to be energized. However, in other examples, where the event may be transient, such as galloping lines or current faults (e.g., caused by a transient event such as tree branches temporarily creating a fault condition, and which may be only temporary in nature), attempts to re-energize the downstream conductors may be determined after a time period, or after an event is determined to no longer be occurring (e.g. when galloping stops).

Upon completing the protective action, data, including the performed protective action is transmitted to the central controller at process block 708, as described above.

As described above, by utilizing local control stations 400 to perform the protective action, the time to respond to certain events is greatly reduced. For examples, it is contemplated that the processes 500, 600, and 700 can be completed in approximately 1000 ms (1 second) or less. This can allow for certain events, such as falling conductor events, to be addressed (e.g., de-energizing the falling conductor) prior to the conductor reaching the ground, which is estimated to generally be from 1 second to 1.5 seconds. Even where the conductors cannot be de-energized prior to the conductor coming into contact with the ground or other object, the conductors can be de-energized nearly immediately thereafter using the processes described herein. This provides a substantial improvement over current event monitoring systems in power distribution, which may often take minutes, or longer to even know that an event has occurred.

In the foregoing specification, specific embodiments have been described. However, one of ordinary skill in the art appreciates that various modifications and changes may be made without departing from the scope of the disclosure as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A power distribution control panel, comprising:
one or more power protection devices;
a controller configured to control an operation of the one or more power protection devices; and
an electronic processor in electronic communication with the controller, wherein the electronic processor is configured to,
receive data from one or more power distribution sensor devices;
based on the received data, determine whether an event associated with one or more components of a power distribution network has occurred, wherein the event requires a protective operation;
determine whether the event occurred on a load side of the one or more power protection devices;
in response to determining that the event occurred on the load side of the one or more power protection devices, instruct the controller to control the power protection devices to perform the protective operation, and
transmit information to a central utility controller, wherein the information includes a description of the event, and protective operations taken in response to the event.

2. The power distribution control panel of claim 1, wherein the protective operation disconnects power to the load side of the power protection devices.

3. The power distribution control panel of claim 1, wherein the event is a falling conductor event.

4. The power distribution control panel of claim 3, wherein the one or more power distribution sensor devices are configured to:
determine that the event is the falling conductor event based on one or more sensed parameters of a conductor of a power distribution network; and
transmit the data to the electronic processor, wherein the data includes data indicating that the falling conductor event was determined.

5. The power distribution control panel of claim 4, wherein the duration of time between the determination of the event being a falling conductor event by the one or more power distribution sensor devices and the protective operation being performed is less than one second.

6. The power distribution control panel of claim 1, wherein determining an event has occurred further includes determining whether the event is a permanent event or a transient event.

7. The power distribution control panel of claim 1, wherein the power protective devices include a recloser.

8. A system comprising:
a plurality of sensor units, each sensor unit comprising:
one or more conductor sensors configured to monitor one or more parameters of a conductor in a power distribution system; and
a conductor support sensing unit in communication with the one or more conductor sensors via a first communication protocol, wherein the conductor support sensing unit includes a communication interface configured to transmit data sensed by the one or more conductor sensors and one or more sensors within the conductor support sensing unit using a second communication protocol;

a local control station, comprising:
- a communication interface configured to communicate with the conductor support sensing unit via the second communication protocol;
- one or more protective devices; and
- a controller configured to:
  - receive data from one or more of the plurality of sensing units;
  - determine whether an event associated with one or more components of a power distribution network occurred based on the received data;
  - determine whether the event requires a protective action in response to determining that the event occurred;
  - determine whether the event occurred downstream of the local control station; and
  - in response to determining that the event requires protective action and occurred downstream of the local control station, controlling the one or more protective devices to perform a protective operation.

9. The system of claim 8, wherein the protective operation disconnects power from conductors downstream of the local control station.

10. The system of claim 8, wherein the plurality of sensor units are configured to:
- detect a falling conductor event;
- generate a falling conductor alert; and
- transmit the falling conductor alert to the conductor support sensing unit using the first communication protocol.

11. The system of claim 10, wherein the plurality of sensor units are configured to:
- receive the falling conductor alert; and
- transmit the falling conductor alert and additional data associated with the falling conductor alert to the local control station.

12. The system of claim 11, wherein the duration of time between the detection of the falling conductor event and the protective action being performed is one second.

13. The system of claim 8, wherein the second communication protocol is a wireless communication protocol operating between 450 MHz and 470 MHz.

14. The system of claim 8, further comprising a local controller configured to facilitate communication between the conductor support sensing unit and the local control station using the second communication protocol.

15. A method, comprising:
- receiving data indicating an event associated with a power distribution system has occurred at a local control station;
- determining whether the event requires protective action;
- determining whether the local control station receiving the data can perform a protective operation in response to determining that the event requires protective action, wherein the local control station receiving the data is determined to be able to perform the protective operation based on the event being determined to occur downstream of the local control station;
- performing the protective operation in response to determining that the local control station receiving the data can perform the protective operation, and
- transmitting the event to a central utility controller in response to determining that the local control station receiving the data cannot perform the protective operation.

16. The method of claim 15, wherein the local control station receiving the data is determined to be able to perform the protective operation based on the event being determined to occur downstream of the local control station.

17. The method of claim 15, wherein the protective operation includes removing power downstream of the local control station via one or more protective devices of the local control station.

18. The method of claim 15, further comprising:
- sensing the event using one or more sensor units; and
- transmitting the event to the local control station via the one or more sensor units.

19. The method of claim 18, wherein the duration of time between sensing the event and performing the protection operation is less than one second.

* * * * *